United States Patent
Ansari et al.

(10) Patent No.: US 12,367,242 B2
(45) Date of Patent: Jul. 22, 2025

(54) DECENTRALIZED ONLINE MULTI-AGENT VISUAL QUESTION ANSWERING

(71) Applicant: International Business Machines Corporation, Armonk, NY (US)

(72) Inventors: Ghulam Ahmed Ansari, Sikhvillage Secunderabad (IN); Sai Koti Reddy Danda, Narasaraopeta (IN); Amrita Saha, Bangalore (IN); Srikanth Govindaraj Tamilselvam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 17/118,211

(22) Filed: Dec. 10, 2020

(65) Prior Publication Data

US 2022/0188362 A1 Jun. 16, 2022

(51) Int. Cl.
*G06F 16/9032* (2019.01)
*G06F 9/50* (2006.01)
(Continued)

(52) U.S. Cl.
CPC ...... *G06F 16/90332* (2019.01); *G06F 9/5072* (2013.01); *G06N 3/098* (2023.01);
(Continued)

(58) Field of Classification Search
CPC ............. G06F 16/90332; G06F 9/5072; G06F 2211/009; G06N 3/098; G06N 5/043;
(Continued)

(56) References Cited

U.S. PATENT DOCUMENTS 11,195,084 B1 * 12/2021 Wu .................. G06N 3/044
2016/0342895 A1   11/2016 Gao
(Continued)

FOREIGN PATENT DOCUMENTS

CN    107480206 A    12/2017
CN    109255359 A    1/2019

OTHER PUBLICATIONS

Zhang et al., "Multi-Agent Reinforcement Learning: A Selective Overview of Theories and Algorithms" v1, Nov. 24, 2019, https://arxiv.org/abs/1911.10635.*
Tan et al., "Multi-agent Embodied Question Answering in Interactive Environments," Aug. 23, 2020, https://dl.acm.org/doi/10.1007/978-3-030-58601-0_39.*

(Continued)

*Primary Examiner* — Ryan Barrett
(74) *Attorney, Agent, or Firm* — Onyx IP Group

(57) ABSTRACT

An approach to real-time multi-agent visual question answering in a decentralized environment. The approach can include initializing a plurality of agents based on data associated with an image and a question about the image. The approach can include identifying a first portion of the plurality of agents to construct a grid of agents based on similarity between the first portion of agents. The approach can include determining a second portion of agents of the first portion of agents with edges between agents allowing sharing of agent concepts and agent parameters. The approach can include generate training trajectories of the grid of agents based on executing a collaborative rollout. Additionally, the approach can include optimizing agent policies of the grid of agents.

20 Claims, 7 Drawing Sheets

(51) Int. Cl.
  *G06N 3/098* (2023.01)
  *G06N 5/043* (2023.01)
  *G06N 20/00* (2019.01)

(52) U.S. Cl.
  CPC ............ *G06N 5/043* (2013.01); *G06N 20/00* (2019.01); *G06F 2211/009* (2013.01)

(58) Field of Classification Search
  CPC ........ G06N 20/00; G06N 3/006; G06N 3/042; G06N 3/084; G06N 5/041
  See application file for complete search history.

(56) References Cited

U.S. PATENT DOCUMENTS

| | | | |
|---|---|---|---|
| 2017/0124432 A1 | 5/2017 | Chen | |
| 2019/0042867 A1* | 2/2019 | Chen | H04L 9/3239 |
| 2020/0320133 A1* | 10/2020 | Yaramada | G06F 40/35 |
| 2020/0342850 A1* | 10/2020 | Vishnoi | G06F 40/30 |

OTHER PUBLICATIONS

Le et al., "Coordinated Multi-Agent Imitation Learning," May 25, 2018, https://arxiv.org/abs/1703.03121.*

Shui et al., "A Principled Approach for Learning Task Similarity in Multitask Learning," May 31, 2019, https://arxiv.org/abs/1903.09109.*

Zhao et al., "On Learning Language-Invariant Representations for Universal Machine Translation," Aug. 11, 2020, https://arxiv.org/abs/2008.04510.*

Mell et al., "The NIST Definition of Cloud Computing", Recommendations of the National Institute of Standards and Technology, Special Publication 800-145, Sep. 2011, 7 pages.

Schulman et al., "Proximal Policy Optimization Algorithms", arXiv:1707.06347v2 [cs.LG], Aug. 28, 2017, 12 pages.

Schulman et al., "Trust Region Policy Optimization", Proceedings of the 31st International Conference on Machine Learning, Lille, France, arXiv:1502.05477v5 [cs.LG], Apr. 20, 2017, 16 pages.

* cited by examiner

DECENTRALIZED ONLINE MULTI-AGENT VISUAL QUESTION ANSWERING

TECHNICAL FIELD OF THE INVENTION

The present disclosure relates generally to the field of visual question answering (VQA), and more particularly to real-time multi-agent visual question answering in a decentralized environment.

BACKGROUND OF THE INVENTION

VQA has been explored extensively in the context of Neural Networks, but the recent program induction, i.e., symbolic reasoning, based approaches have pushed the boundaries, by providing, interpretability, modularity and transferability to a VQA pipeline. The general notion of symbolic reasoning based VQA methods answers a question by inducing neural programs, e.g., symbols, divided by the quantity of operators, e.g., "find," "relate," etc., multiplied by concept trajectories, e.g., "man," "next to," "red," "soft," etc.

Currently, state of the art VQA is focused on offline learning from static datasets where offline learning involves only a fixed set of concepts. For example, a VQA could be built for Animals and a person with specific attributes, e.g., color, size, position, and could answer questions like "yellow cat" or "dog next to man." However, unseen concepts like jewelry, even if associated with a person or animal, may not be answerable by the system.

SUMMARY

According to an embodiment of the present invention, a computer-implemented method for real-time multi-agent visual question answering in a decentralized environment, the computer-implemented method comprising: initializing a plurality of agents based on data associated with an image and a question about the image; identifying a first portion of the plurality of agents to construct a grid of agents based on similarity between the first portion of agents; determining a second portion of agents of the first portion of agents with edges between agents allowing sharing of agent concepts and agent parameters; generating training trajectories of the grid of agents based on executing a collaborative rollout; and optimizing agent policies of the grid of agents.

According to an embodiment of the present invention, A computer system for real-time multi-agent visual question answering in a decentralized environment, the computer system comprising: one or more computer processors; one or more computer readable storage media; program instructions stored on the one or more computer readable storage media for execution by at least one of the one or more processors, the program instructions comprising: program instructions to initialize a plurality of agents based on data associated with an image and a question about the image; program instructions to identify a first portion of the plurality of agents to construct a grid of agents based on similarity between the first portion of agents; program instructions to determine a second portion of agents of the first portion of agents with edges between agents allowing sharing of agent concepts and agent parameters; program instructions to generate training trajectories of the grid of agents based on executing a collaborative rollout; and program instructions to optimize agent policies of the grid of agents.

According to an embodiment of the present invention, A computer program product for real-time multi-agent visual question answering in a decentralized environment, the computer program product comprising: one or more non-transitory computer readable storage media and program instructions stored on the one or more non-transitory computer readable storage media, the program instructions comprising: program instructions to initialize a plurality of agents based on data associated with an image and a question about the image; program instructions to identify a first portion of the plurality of agents to construct a grid of agents based on similarity between the first portion of agents; program instructions to determine a second portion of agents of the first portion of agents with edges between agents allowing sharing of agent concepts and agent parameters; program instructions to generate training trajectories of the grid of agents based on executing a collaborative rollout; and program instructions to optimize agent policies of the grid of agents.

Figure 1:
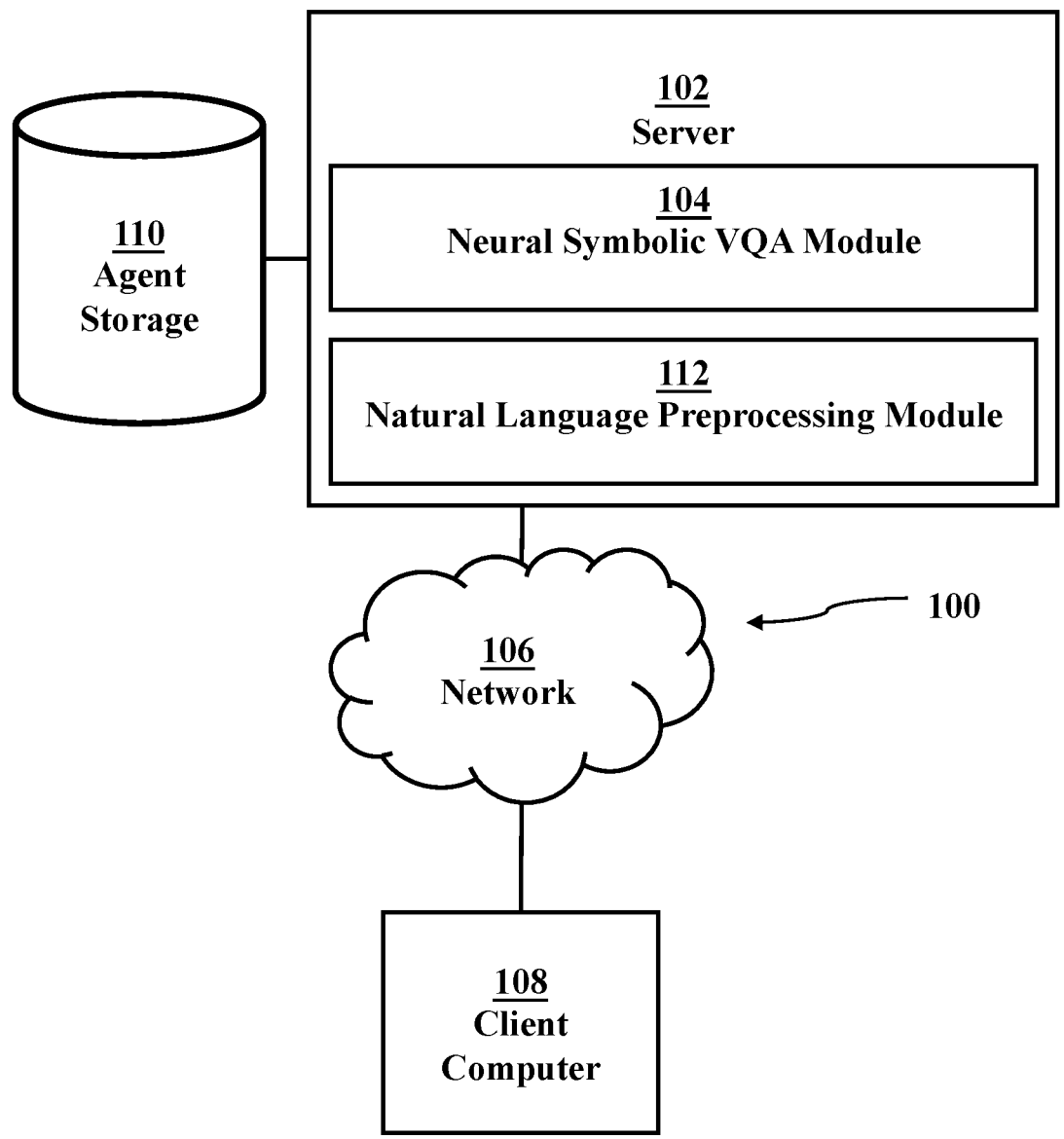
FIG. 1 is a functional block diagram generally depicting a decentralized online multi-agent visual question answering environment 100, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Embodiments depicted and described herein recognize the benefits of decentralized online multi-agent visual question answering and the optimizations that can be achieved by deciding, i.e., prioritizing the order of invoking the plurality of agents when decomposing the query into a sequence of neural-symbolic reasoning. In real-world contexts, concepts can arise in real-time, from both a referenced data source and questions from a user associated with a query, requiring continuous mining of concepts.

Accordingly, the embodiments further recognize the need to provide multiple agents that intelligently collaborate based on sharing their learned knowledge of individual concepts in a decentralized and distributed fashion. In another aspect, the embodiments can prioritize invocation order of the plurality of agents, minimizing the overall error cascading over the sequential decisions. Further, the embodiments can determine parameters that can be shared between agents based on relevant models associated with the selected agents.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

FIG. 1 is a functional block diagram depicting, generally, a decentralized online multi-agent visual question answering environment 100. decentralized online multi-agent visual question answering environment 100 comprises neural symbolic visual question answering (VQA) module 104 and natural language preprocessing (NLP) module 112, both operational on server 102, and network 106 supporting communications between server 102 and client computer 108. As shown in FIG. 1, client computer 108 can access neural symbolic VQA module 104 and NLP module 112 via network 106. While only one client computer 108 is shown in decentralized online multi-agent visual question answering environment 100, this is for ease of description, as multiple client computers can be operational within decentralized online multi-agent visual question answering environment 100.

Server 102 and client computer 108 can be a standalone computing device, a management server, a web server, a mobile computing device, or any other electronic device or computing system capable of receiving, sending, and processing data. In other embodiments, server 102 and client computer 108 can represent a server computing system utilizing multiple computers as a server system. It should be noted, while one server is shown in FIG. 1, decentralized online multi-agent visual question answering environment 100 can have any number of servers. In another embodiment, server 102 and client computer 108 can be a laptop computer, a tablet computer, a netbook computer, a personal computer, a desktop computer, or any programmable electronic device capable of communicating with other computing devices (not shown) within decentralized online multi-agent visual question answering environment 100 via network 106.

In another embodiment, server 102 and client computer 108 can represent a computing system utilizing clustered computers and components (e.g., database server computers, application server computers, etc.) that can act as a single pool of seamless resources when accessed within decentralized online multi-agent visual question answering environment 100. Server 102 and client computer 108 can include internal and external hardware components, as depicted and described in further detail with respect to FIG. 6.

Neural symbolic VQA module 104 can be a module for coordinating and establishing collaborative reasoning between a plurality of agents. The collaborative reasoning can be based on the modular nature of the neural symbolic VQA module 104 and the associated plurality of agents. The collaborative reasoning can use joint training and neural program induction (NPI) setup allowing plug-and-play operation during inference and sharing of concept components from the plurality of agents.

Network 106 can be, for example, a local area network (LAN), a wide area network (WAN) such as the Internet, or a combination of the two, and can include wired, wireless, or fiber optic connections. In general, network 106 can be any combination of connections and protocols that will support communications between servers 102 and client computer 108.

Agent storage 110 can be located on server 102. It should be noted that agent storage 110 can be located on other servers (not shown) not co-located with neural symbolic VQA module 104. Agent storage 110 can store a plurality of agents for interaction with neural symbolic VQA module 104. It should be noted that an agent can also be known as an online neural symbolic VQA agent. An agent can comprise an input question image processor, one or more neural concept components, one or more operators and a neural controller for generating a program sequence.

An agent can operate by reducing a question to one or more induced programs, i.e., a sequence of functions, each of which is a neural module. The induced programs can be subsequently executed to obtain an answer to the question. It should be noted that in an online environment, neural modules, i.e., new operations, can be learned dynamically. For example, a model may require adding a skill of counting based on a question of quantitative reasoning. Further, a model can be exposed to new concepts based on the capabilities of the associated agents, wherein programmatic decomposition of complex tasks can generalize and scale to new operations and/or concepts. In another aspect of a multi-agent implementation, a programmatic decomposition can act as a translation to a universal language, i.e., a representation space, across different agents, enabling parameter and/or knowledge transfer between agents and can allow combining inferences from multiple agents in a modular implementation.

Figure 2:
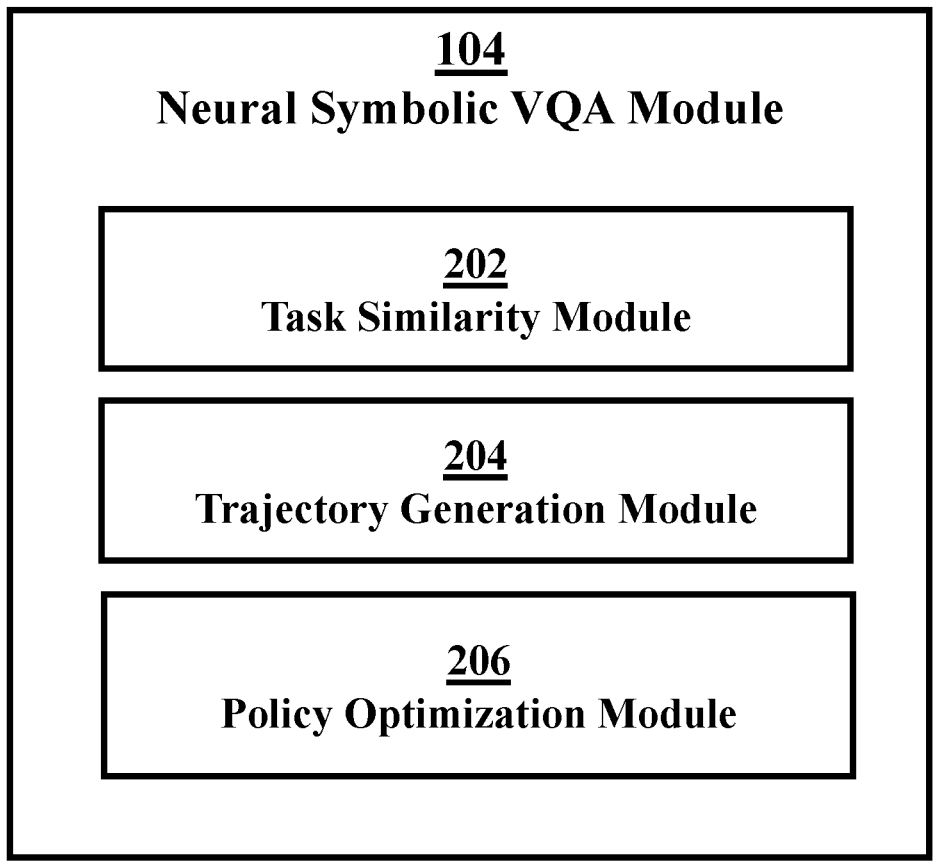
FIG. 2 is a functional block diagram depicting a neural symbolic visual question module, in accordance with an embodiment of the present invention.

FIG. 2 is a functional block diagram 200 of neural symbolic VQA module 104 further comprising task similarity module 202, trajectory generation module 204 and policy optimization module, operational within neural symbolic VQA module 104. Neural symbolic VQA module and its component modules can train a plurality of agents to learn policies, i.e., programs, required to answer a presented question. Neural symbolic VQA module 104 can initialize a plurality of agents with a batch of applicable data; construct a grid of agents based on task similarity module identifying connection points between agents, i.e., make a determination that the task of the connected agents is similar; facilitate agents sharing parameters and concepts based on identified edges between agents; run collaborative rollouts on a finalized grid of agents and generate trajectories for training; and optimize an agent's policies based on holding associated agent policies constant and applying natural gradients based backpropagation. It should be noted that training can be done offline for each of the VQA agents wherein the VQA agents can be domain specific or task specific. Further, individual VQA agents can be enabled for a decentralized answering of a query, wherein the query requires concepts and operator embeddings that are not present within a single VQA agent and result in collaboration of a plurality of VQA agents during inference time.

In one embodiment there can be a decentralized VQA system requiring minimal collaboration between a plurality of VQA agents, i.e., there is a distinction between VQA agent collaboration during training phase and inference phase. The plurality of VQA agents are not required to collaborate during the training phase but can collaborate during the inference phase, e.g., concepts and operators can be shared. In another embodiment specific VQA agents can be associated with a specific domain or a specific task, respectively. VQA agents, during a training phase, can be trained separately without the knowledge of other VQA agents. Subsequently, during an inference phase, VQA agents can collaborate with each other and exchange concepts and operators based on a presented query.

Task similarity module 202 can be a computer module capable of predicting if a plurality of agents should have an edge between them. Once an edge is predicted, an associated agent can borrow modules from agents having an edge the highest task similarity score. Accordingly, multi-agent neural symbolic VQA module 104 can apply the highest rated concepts to the instant visual question without retraining an agent. For example, a pair of agents can be presented with an image and a question. Task similarity module 202 can comprise a concept encoder, a question encoder, based on natural language preprocessing module 112, and an image encoder. Task similarity module 202 can receive the pair of agent questions at the question encoder, the pair of agent images at the image encoder and the pair of agent concepts at the concept encoder. The encoded concepts, questions and images can then be forwarded to a comparator for the encoded concepts, a comparator for the encoded questions and a comparator for the encoded images, respectively. The output from the comparators can then be forwarded to a scorer that predicts the appropriateness of the edge between the two agents.

For example, any of the available, e.g., open source Sematic Measures Library (SML) and Toolkit, Unified Medical Language System (UMLS) Similarity module, etc. The similarity ranking can be employed on top of the domain specific or task specific VQA agent to determine the relevant agents for the task at hand. In one simple example, a global index can maintain the details of the specific tasks a particular VQA can perform. In another, more complex, example, wherein a learning agent determines the similarity as described in "A Principled Approach for Learning Task Similarity in Multitask Learning" by Shui, C., Abbasi, M., Robitaille, L., Wang, B., Gagne, C.; Proceedings of the Twenty-Eighth International Joint Conference on Artificial Intelligence; pages 3446-3452 (https://arxiv.org/abs/1903.09109).

Trajectory generation module 204 can be a computer module that can not only provide intra agent rollouts but also can provide collaborative rollouts, enabling similar agents to learn simultaneously. Further, trajectory generation module 204 can employ concepts and parameters from a plurality of agents to construct a program to solve a question provided to an agent. For example, a pair of agents with a predicted edge can be presented with an image and a question. The pair of agents can individually generate a program to answer the question based on their training and the pair of agents can borrow parameters and/or concepts from other agents with associated edges to construct a program to solve the presented question.

Policy optimization module 206 can be a computer module capable of determining which generated program is the optimal program to answer the question based on prioritizing the ordering of invoking different agents when decomposing the question into a sequence of neural symbolic reasoning steps and minimizing overall error cascading over the sequential steps of the program. For example, an image can be submitted with the question "What is the animal that is gray in color, next to the man?" Agent 1 has learned attribute concepts such as "gray," "color," etc. Agent 2 has learned relational concepts such as "next to," etc. Answering the presented question requires both agents but two different program flows are possible. In a first program the flow can be . . .

A=Filter('Concept::Gray');
B=Relate('Color,' A, 'Animal'); and
C=Relate('Next To,' B, Man).

In a second program the flow can be . . .

A=Filter('Concept::Man');
B=Relate('Next To,' A, 'Animal'); and
C=Relate('Color,' B, 'Animal').

Although both programs correctly answer the question, the two programs will not have the same performance based on how the error cascades along the program steps. Policy optimization module 206 will determine the best program to answer the question based on a determination of the best performing program. In one aspect, the program that can answer the question in the least amount of time is selected as the best program. It should be noted that an optimization equation such as a Neighbors Aware Trust Region Policy Optimization can be used with constraints added to control divergence based on the number of agents sharing concepts and parameters. For example, any of the well-known policy optimization techniques can be employed in the reinforcement learning, e.g., "Trust Region Policy Optimization" by Schulman, J., Levine, S., Moritz, P., Jordan, M., Abbeel, P.; University of California, Berkeley, Department of Electrical Engineering and Computer Science; Apr. 20, 2017 (https://arxiv.org/abs/1502.05477) or "Proximal Policy Optimization Algorithms" by Schulman, J., Wolski, F., Dhariwal, P., Radford, A., Klimov, O.; OpenAI.com; (https://arxiv.org/abs/1707.06347) and its variants for the multi-agent reinforcement learning.

Figure 3:
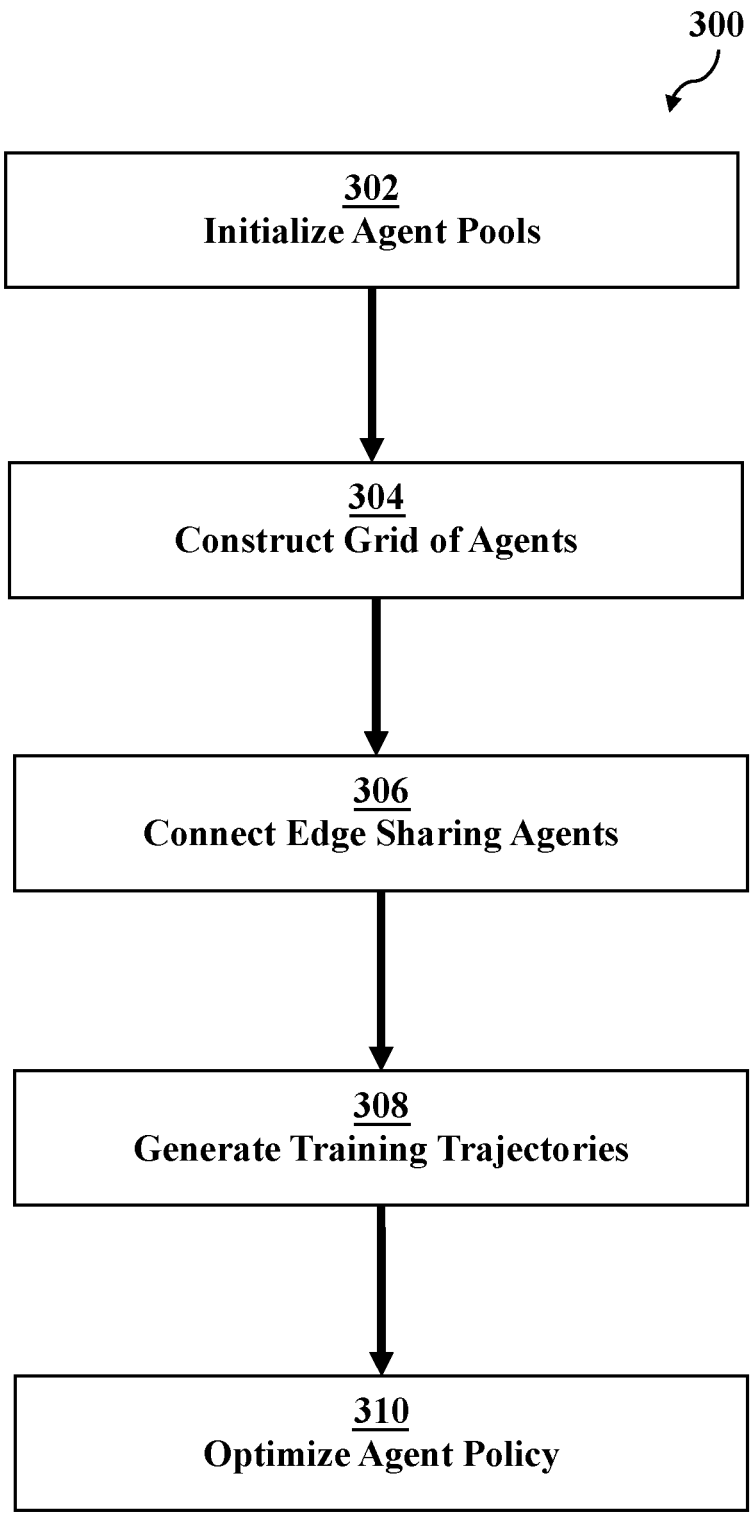
FIG. 3 is a flowchart depicting a method for prioritizing agent invocation for decentralized online multi-agent visual question answering, in accordance with an embodiment of the present invention.

FIG. 3 is a flowchart depicting a method 300 for a decentralized multi-agent neural symbolic visual question answering system. At 302, a plurality of agents is initialized with data associated with an image and a question concerning the image. At 304, a grid of agents is constructed based on similarities between agents with regard to parameters and concepts associated with the image and the question, identified by the initialization data. At 306, agents determined to share edges are connected such that the connected agents can share concepts and parameters. At 308, the grid of agents is trained as a collaborative rollout, allowing similar agents to learn collectively. The use of collaborative rollouts allows agent trajectories to share concepts, and care must be taken to prevent disturbing policies of other agents. At 310, the agent policies of the grid of agents is optimized based on the training trajectories.

Figure 4:
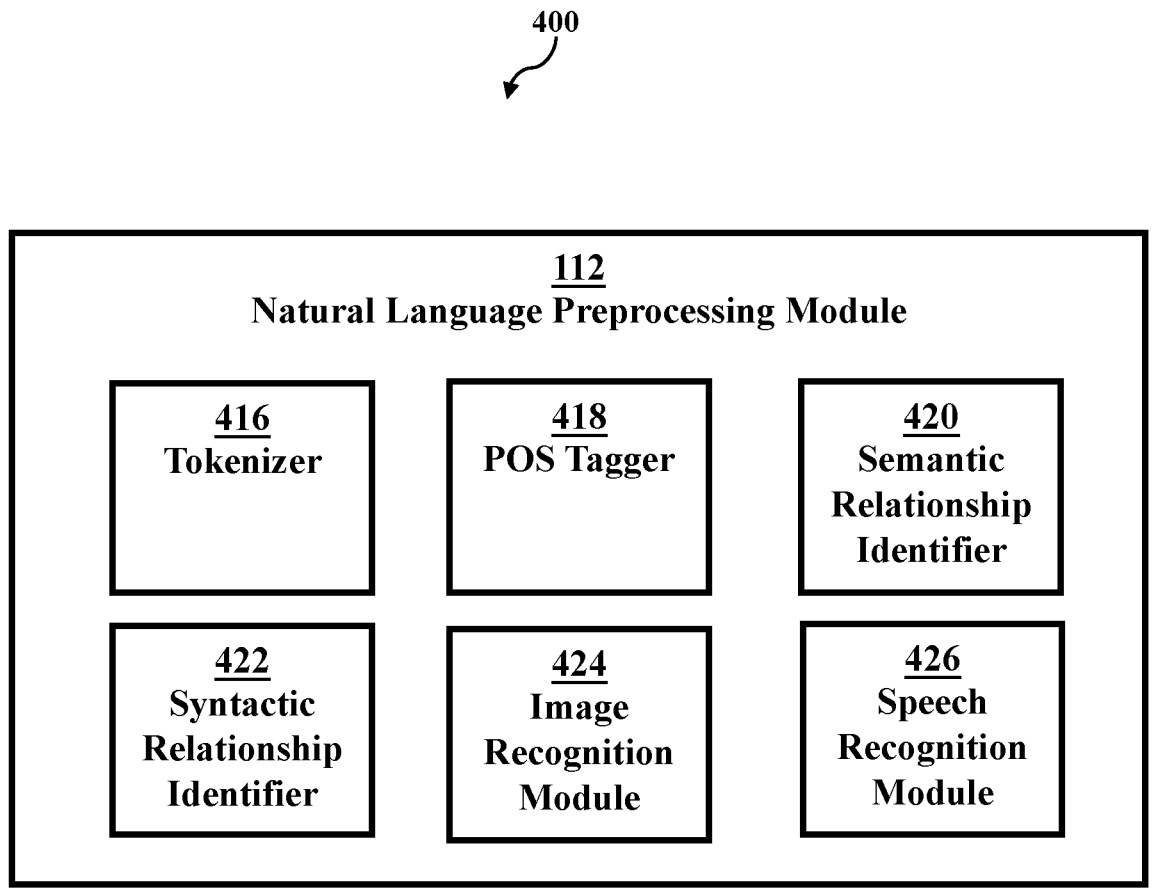
FIG. 4 is a functional block diagram of an exemplary natural language processing system, in accordance with an embodiment of the present invention.

FIG. 4 is a functional block diagram of an exemplary natural language preprocessor 400 configured to preprocess natural language queries, in accordance with an embodiment of the present invention. Natural language preprocessing module 402 can be operational within neural symbolic VQA module 104, task similarity module 202, or it may be a stand-alone system in communication with neural symbolic VQA module 104 via network 106. In some embodiments, neural symbolic VQA module 104 may send a query to be analyzed to the natural language preprocessing module 402. Further, a query (e.g. spoken, text, or unstructured data) may be directly received by natural language preprocessing module 402. Additionally, natural language preprocessing module 402 can send a preprocessed query to task similarity module 202.

The natural language preprocessing module 402 may perform various methods and techniques for preprocessing a natural language query (e.g., syntactic analysis, semantic analysis, etc.). The natural language preprocessing module 402 may be configured to recognize and analyze any number of natural languages. In some embodiments, natural language preprocessing module 402 may group one or more sections of a query into one or more subdivisions. Further, natural language processing module 402 may include various modules to perform analyses of a query. These modules may include, but are not limited to, a tokenizer 416, a part-of-speech (POS) tagger 418 (e.g., which may tag each of the one or more sections in which the particular subject is identified), a semantic relationship identifier 420, a syntactic relationship identifier 422, an image recognition module 424 (which may identify natural language queries and additional information from unstructured data), and a speech recognition module 426.

In some embodiments, the tokenizer 416 may be a computer module that performs lexical analysis. The tokenizer 416 may convert a sequence of characters into a sequence of tokens. A token may be a string of characters included in a recording and categorized as a meaningful symbol. Further, in some embodiments, the tokenizer 416 may identify word boundaries in a recording and break any text within event error text descriptions into component text elements, such as words, multiword tokens, numbers, and punctuation marks. In some embodiments, the tokenizer 416 may receive a string of characters, identify the lexemes in the string, and categorize them into tokens.

Consistent with various embodiments, the POS tagger 418 may be a computer module that marks up a word in a query to correspond to a particular part of speech. The POS tagger 418 may read a passage or other text in natural language and assign a part of speech to each word or other token. The POS tagger 418 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed event error text descriptions. Examples of parts of speech that may be assigned to words include, but are not limited to, nouns, verbs, adjectives, adverbs, and the like. Examples of other part of speech categories that POS tagger 418 may assign include, but are not limited to, comparative or superlative adverbs, wh-adverbs, conjunctions, determiners, negative particles, possessive markers, prepositions, wh-pronouns, and the like. In some embodiments, the POS tagger 418 may tag or otherwise annotate tokens of an event error text description with part of speech categories. In some embodiments, the POS tagger 418 may tag tokens or words of an event error text description to be parsed by the natural language preprocessing module 402.

In some embodiments, the semantic relationship identifier 420 may be a computer module that may be configured to identify semantic relationships of recognized subjects (e.g., words, phrases, images, etc.) in an event error text description. In some embodiments, the semantic relationship identifier 420 may determine functional dependencies between entities and other semantic relationships.

Consistent with various embodiments, the syntactic relationship identifier 422 may be a computer module that may be configured to identify syntactic relationships in an event error text description composed of tokens. The syntactic relationship identifier 422 may determine the grammatical structure of sentences such as, for example, which groups of words are associated as phrases and which word is the subject or object of a verb. The syntactic relationship identifier 422 may conform to formal grammar.

Image recognition module 424 may be a computer module that can be configured to recognize text within unstructured data. For example, in some embodiments, image recognition module 424 can be a computer module with a neural network capable of scanning pixels of a document (medical journal article, medical data within a slide presentation, medical report in a word processor, etc.) to recognize various fonts and handwritten characters, using various models including pattern matching, pattern recognition, image correlation, etc. Further, in some embodiments image recognition module 424 may be a neural network configured to recognize and predict the following letter within an unstructured data document, also known as nearest neighbor classifier, for example Cuneiform and Tesseract.

Speech recognition module 426 is a computer module configured to receive a spoken natural language query and transform it into a computer readable format. In an embodiment, an acoustic model may change a spoken natural language query into wave format or phonemes. The wave format or phonemes can be translated into characters associated with the respective wave format or phoneme. Speech recognition module 426 may also have predictive capabilities to ensure correct characters or words are assigned to a wave format or phonemes based on a previously identified object. For example, using a statistical model (e.g. hidden markov model) the potential words following an identified word can narrow down the words that must be searched to identify the phoneme or wave form.

Figure 5:
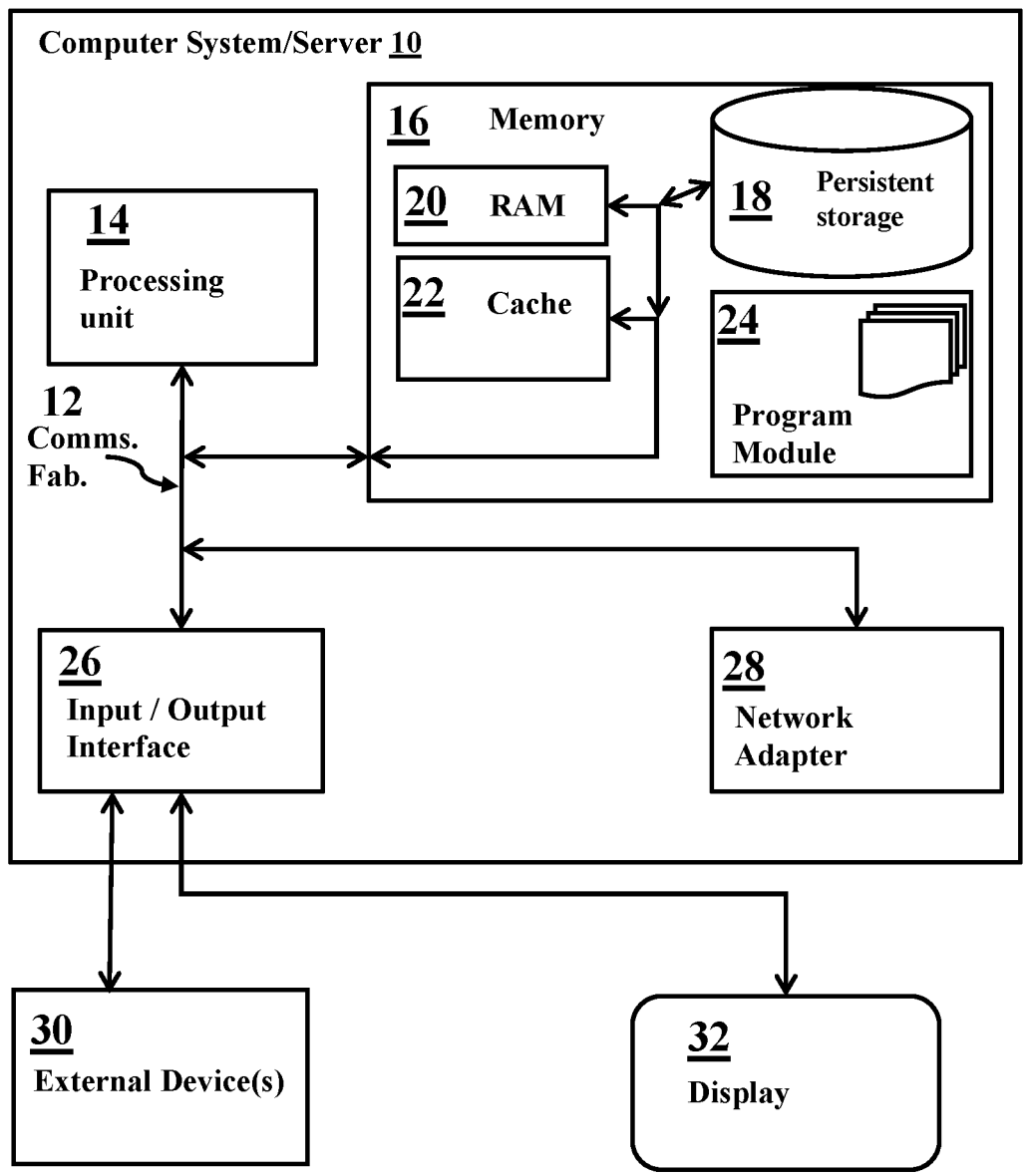
FIG. 5 is a functional block diagram of an exemplary computing system within a computing system event error diagnosis environment, in accordance with an embodiment of the present invention.

FIG. 5 depicts computer system 10, an example computer system representative of a dynamically switching user interface computer system 10. Computer system 10 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 10 includes processors 14, cache 22, memory 16, persistent storage 18, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes random access memory (RAM) 20. In general, memory 16 can include any suitable volatile or non-volatile computer readable storage media. Cache 22 is a fast memory that enhances the performance of processors 14 by holding recently accessed data, and data near recently accessed data, from memory 16.

Program instructions and data used to practice embodiments of the present invention may be stored in program module 24, persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
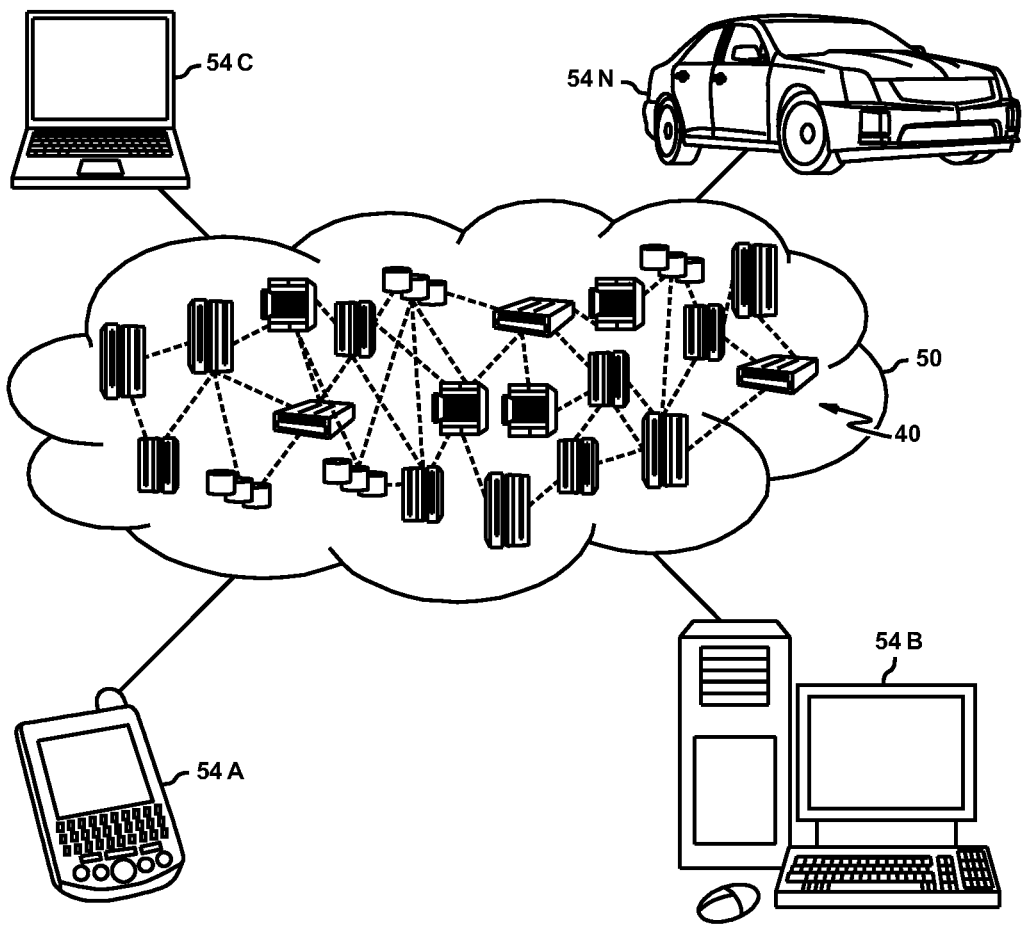
FIG. 6 is a diagram depicting a cloud computing environment, in accordance with an embodiment of the present invention.

FIG. 6 is a block diagram depicting a cloud computing environment 50 in accordance with at least one embodiment of the present invention. Cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
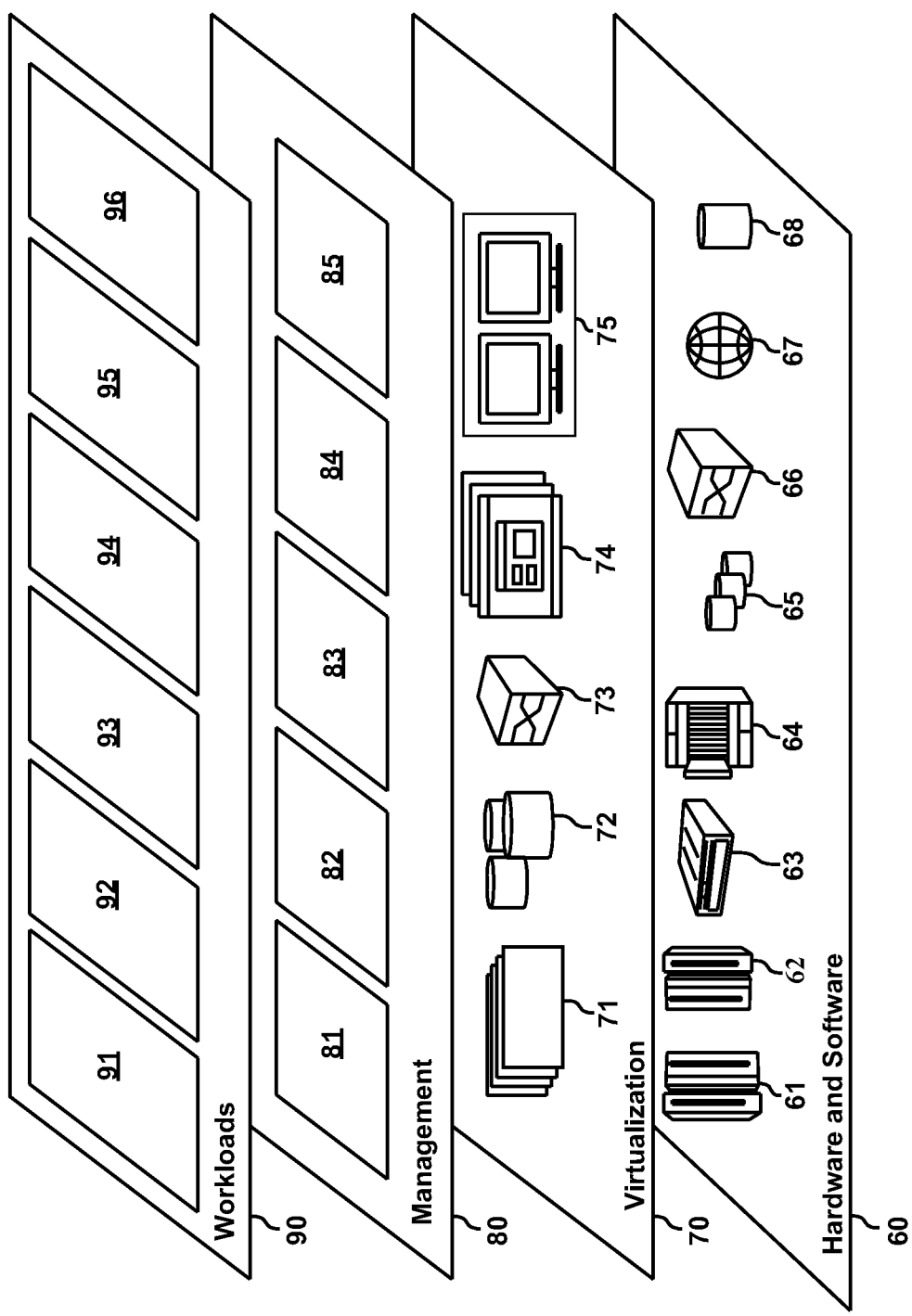
FIG. 7 is a functional block diagram depicting abstraction model layers, in accordance with an embodiment of the present invention.

FIG. 7 is a block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Neural symbolic VQA module 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    training a plurality of agents based on data associated with images and questions about the images,
        wherein the plurality of agents are located on one or more servers, and
        wherein the plurality of agents include models that are trained, based on the data, to perform neural symbolic visual question answer (VQA) tasks;
    determining a pair of agents of the plurality of agents based on a similarity of a task to be performed by the pair of agents,
        wherein the pair of agents are allowed to share parameters, and
        wherein the pair of agents include processors, neural network components, and neural concept controllers;
    providing an image and a question, associated with the image, to the pair of agents;
    generating, using a first neural concept controller of a first agent of the pair of agents, a first program to answer the question;
    generating, using a second neural controller of a second agent of the pair of agents, a second program to answer the question,
        wherein the first program and the second program are generated by the pair of agents during an inference phase;
    determining the first program or the second program to be used to generate an answer to the question, wherein the first program or the second program is determined based on a performance of the first program and a performance of the second program;
    executing the first program or the second program to generate the answer; and
    providing, via a network, the answer to a computing device.

2. The computer-implemented method of claim 1, further comprising:
   determining an order of invoking the plurality of agents based on minimizing overall error cascading associated with the order.

3. The computer-implemented method of claim 1, wherein determining the first program or the second program to be used to generate the answer comprises determining the first program or the second program to be used to generate the answer to the question based on optimizing agent policies,
   wherein the optimizing agent policies are based on a neighbors aware trust region policy optimization.

4. The computer-implemented method of claim 1, wherein the plurality of agents reside on different servers.

5. The computer-implemented method of claim 1, wherein the first agent and the second agent share the parameters based on a task similarity score.

6. The computer-implemented method of claim 1, wherein determining the first program or the second program to be used to generate the answer comprises determining the first program or the second program to be used to generate the answer to the question based on optimizing agent policies,
   wherein the optimizing agent policies are based on adding additional constraints to agent policies of an agent borrowing concepts and parameters to control divergence.

7. The computer-implemented method of claim 1, further comprising:
   mapping the question to the pair of agents based on a similarity ranking regarding the pair of agents.

8. The computer-implemented method of claim 1, further comprising:
   translating multilingual portions of the question to a universal language of generic operators and operands.

9. A computer system comprising:
   one or more computer processors;
   one or more computer readable storage media;
   program instructions stored on the one or more computer readable storage media for execution by at least one of the one or more processors, the program instructions comprising:
      program instructions to train a plurality of agents based on data associated with images and questions about the images;
      program instructions to determine a pair of agents of the plurality of agents based on a similarity of tasks performed by the pair of agents,
         wherein the pair of agents include processors and controllers;
      program instructions to provide an image and a question, associated with the image, to the pair of agents;
      program instructions to generate, using controllers of the pair of agents, different programs to answer the question; and
      program instructions to determine a particular program, of the different programs, to answer the question based on a performance of the particular program; and
      program instructions to execute the particular program to generate an answer to the question,
         wherein the answer is provided to a computing device via a network.

10. The computer system of claim 9, further comprising:
    program instructions to determine an order of invoking the plurality of agents based on minimizing overall error cascading associated with the order.

11. The computer system of claim 9, wherein the program instructions to determine the particular program comprise program instructions to determine the particular program based on optimize agent policies that are based on a neighbors aware trust region policy optimization.

12. The computer system of claim 9, wherein the pair of agents reside on different servers.

13. A computer program product comprising:
    one or more non-transitory computer readable storage media and program instructions stored on the one or more non-transitory computer readable storage media, the program instructions comprising:
       program instructions to train a plurality of agents based on data associated with images and questions about the images;
       program instructions to provide an image and a question, associated with the image, to a pair of agents of the plurality of agents,
          wherein the pair of agents include processors and controllers;
       program instructions to generate, using a first controller of a first agent of the pair of agents, a first program to answer the question;
       program instructions to generate, using a second controller of a second agent of the pair of agents, a second program to answer the question,
          wherein the first program and the second program are generated by the pair of agents during an inference phase;
       program instructions to determine the first program or the second program to answer the question based on a performance of the first program and a performance of the second program; and
       program instructions to execute the first program or the second program to generate an answer to the question,
          wherein the answer is provided to a computing device via a network.

14. The computer program product of claim 13, further comprising:
    program instructions to determine an order of invoking the plurality of agents based on minimizing overall error cascading associated with the order.

15. The computer program product of claim 13, wherein the program instructions to determine the first program or the second program comprise program instructions to determine the first program or the second program based on optimize agent policies that are based on a neighbors aware trust region policy optimization.

16. The computer program product of claim 13, wherein the pair of agents reside on different servers.

17. The computer program product of claim 13, wherein the pair of agents share parameters based on a task similarity score.

18. The computer program product of claim 13, wherein program instructions to determine the first program or the second program comprise program instructions to determine the first program or the second program based on optimize agent policies that are based on adding additional constraints to agent policies of an agent borrowing concepts and parameters to control divergence.

19. The computer program product of claim 13, further comprising:
 program instructions to map the question to the pair of agents based on a similarity ranking regarding the pair of agents.

20. The computer program product of claim 13, further comprising:
 program instructions to translate multilingual portions of the question to a universal language of generic operators and operands.

* * * * *